June 8, 1965  BUNSAKU SHIOMI  3,188,519
AUTOMATIC CONTROL SYSTEM FOR HEADLIGHTS OF MOTOR VEHICLES
COMPRISING A SUPPLEMENTARY LIGHT WITH FILTER Filed Oct. 13, 1959  2 Sheets-Sheet 1

INVENTOR.
BUNSAKU SHIOMI

United States Patent Office 3,188,519
Patented June 8, 1965

3,188,519
AUTOMATIC CONTROL SYSTEM FOR HEADLIGHTS OF MOTOR VEHICLES COMPRISING A SUPPLEMENTARY LIGHT WITH FILTER
Bunsaku Shiomi, Tokyo, Japan, assignor to Tokuji Kikuyama, Nagoya-shi, Japan
Filed Oct. 13, 1959, Ser. No. 846,149
Claims priority, application Japan, Nov. 11, 1958, 33/32,030
4 Claims. (Cl. 315—83)

The present invention relates to an automatic control system for headlights of a motor vehicle.

In driving at night, when motor vehicles running in opposite directions pass each other, it is a common practice for the driver to dim or switch off the headlight or headlights of the vehicle driven by him to keep other drivers of the on-coming vehicles from being dazzled or blinded for the purpose of preventing traffic accidents. Need for such operation has increased in recent years because of the marked rise of the running speed of motor vehicles. On the other hand, such switching-off or dimming operation, especially on highways having heavy traffic, is troublesome for the driver, and in fact is not carried out at all times rigidly. Under such situations, it has already been suggested to provide a control system in which the headlight or headlights of a motor vehicle are automatically dimmed or switched off by the action of a light beam coming from the on-coming vehicle. However, in such automatic control system, some supplementary source of light is required for meeting the shortage of brightness and luminous flux of the headlights due to dimming. The reason for this is that, without any such supplementary light sources, the headlights being dimmed under the action of light from the on-coming vehicle may not be effective to operate the headlight control system thereof, which means that it be impossible to automatically control the headlights of both vehicles passing each other in opposing directions without failure by the use of a control system of such kind. Accordingly, it is important that such automatic control system operates to dim the headlights on the vehicle by light from an on-coming vehicle while at the same time projecting to the on-coming vehicle an amount of supplementary light energy correspondingly to the decrease in light energy emitted by the headlights. Further, in this case, such supplementary light beam or beams are not permitted to dazzle the driver of the on-coming vehicle, but are required to make up for the decrease in luminous intensity of the headlights on the vehicle provided with a source of such supplementary light energy.

As a source of the above described supplementary light energy, any light beam may be selected such as invisible rays, say, infrared rays or red, violet or other visible light rays. According to the present invention, therefore, there is provided an automatic switching system comprising a high candlepower electric lamp constituting a light source of a main headlight, a low candlepower electric lamp, and a supplementary light such as an infrared electric lamp, these electric lamps being arranged such that they may be switched over automatically by the action of light coming from the headlights of passing vehicles. As stated above, this automatic switching system employs a supplementary light or lights having no dazzling effect on on-coming drivers so that even when dimmed the system may not make similar devices on the on-coming vehicles inoperative. The supplementary lights may each form a source of invisible light such as infrared or visible light such as violet, blue or red. It is known that when an electric lamp is turned on, the luminous intensity of its filament rises to its steady value only after a substantial length of time.

Therefore, it is impossible that the shortage of light energy caused by the switching-off or dimming of the headlights be supplemented at the instant if the supplementary lights be switched on simultaneously with the switching-off or dimming of the headlights.

According to the present invention, there is provided an automatic control system for headlights of an automobile in which the main headlights thereof are automatically switched off or dimmed only when auxiliary headlights and supplementary lights, being switched on before the main headlights are operated, have obtained a sufficient luminous intensity.

In the control system in accordance with this invention, a lightsensitive device such as a phototransistor or a photocell is employed as a means for receiving light from the headlamps on an on-coming vehicle or light from its auxiliary headlights of (lower candle-power) and supplementary lights. When the lightsensitive device receives such light, it generates an electric power output, which is amplified to operate a lamp switching means.

As described above, in the control system of this invention, auxiliary headlights and supplementary lights are turned on while the main headlights are switched off or dimmed, said supplementary lights forming each a source of invisible light such as an infrared lamp or a source of visible light such as a violet, blue, or green light lamp. In any way, as a light source for use in such supplementary lights, an ordinary incandescent lamp is much advantageous in actual use. Thus, in the control system of this invention, an incandescent lamp is preferably employed in combination with a suitable photofilter in the form of a film of gelatine or other organic material colored blue or green.

The photofilter comprising an organic film has in general a very good transparency or penetration coefficient with respect to infrared rays. Thus, it is preferred that supplementary lights each comprising an incandescent lamp are used with a blue-colored organic filter disposed in front thereof for the purpose of projecting blue light and infrared light without giving rise to glare or dazzling effect and discomfort on drivers.

An object of the present invention is to provide an automatic control system for headlights of a motor vehicle which comprises a main headlight or headlights, a supplementary light or lights, a lightsensitive device and means adapted to be controlled by the output of said lightsensitive device so as to dim or switch off said main headlights while switching on said supplementary lights which project light through a filter made of an organic material.

A further object of the present invention is to provide an automatic control system for headlights of a motor vehicle comprising a main headlight or headlights, a supplementary light or lights and a lightsensitive device, which is adapted to be controlled by said lightsensitive device so as to switch on said supplementary lights and subsequently switch off said main headlights.

Other object, features and advantages of the present invention will become apparent from the following description when read with reference to the accompanying drawings illustrating embodiments of the present invention.

In the drawings:

FIGURE 2 is a wiring diagram of another embodiment of the present invention adapted to switch off the main headlights after the auxiliary headlights and the supplementary lights have been switched on;

Figure 1:
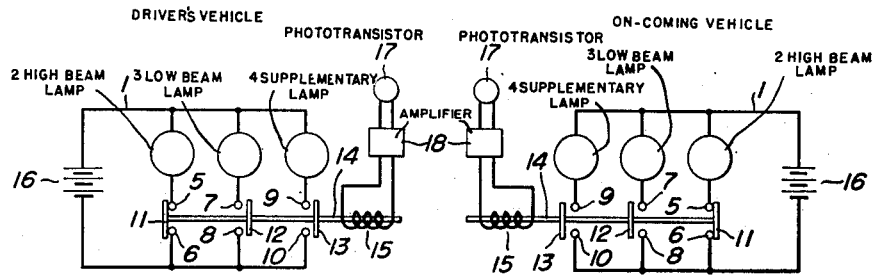
FIGURE 1 is a wiring diagram of an automatic control system for headlights of a motor vehicle embodying the present invention, showing a pair of symmetrically identical parts of the system, one part being on the driver's vehicle and the other being on the on-coming vehicle.

Referring first to FIGURE 1, two circuitries, one on a driver's vehicle and the other on an on-coming vehicle, are shown having an identical construction except that they are arranged symmetrically, each representing an automatic control system for headlights of a motor vehicle according to the present invention, the same reference numerals being applied to various corresponding parts and elements of the two circuitries. A power supply circuit 1 contains a high beam lamp 2, a low beam lamp 3 and a supplementary lamp device 4 connected in parallel. Respective leads from these lamps contain stationary contacts 5–6, 7–8 and 9–10. Movable contacts 11, 12 and 13 are provided to cooperate with the respective stationary contacts and are connected to a common actuating rod 14 so as to be simultaneously actuated by the action thereof. The actuating rod 14 carries at the other end an armature piece or plunger extending through a solenoid 15. This contacting system is arranged so that, when the contacts for the high beam lamp 2 are closed to energize it by an electric source 16 in the circuit 1, the low beam lamp 3 and the supplementary lamp 4 are simultaneously cut off from the electric source 16.

As illustrated, the solenoid coil 15 is connected so as to receive an energizing current from an amplifier 18 connected to a phototransistor 17 of a photosensitive device.

The manner of operation of the above described automatic control system in accordance with the present invention will now be described.

As will be understood, when two motor vehicles provided with the control systems, one on the driver's vehicle and one on the on-coming vehicle, respectively pass each other in opposite directions, they are subjected to light beams from the headlights of each other. The light beam from one of the passing vehicles impinges on the phototransistor 17 in the lightsensitive device on the other vehicle, the output of the phototransistor being amplified to be led to the relay solenoid coil 15 which in turn drives the actuating rod 14 to close the contacts 12 and 13 so that the high beam lamp 2 is switched off and the low beam lamp 3 and the supplementary lamp 4 switched on. Thus it will be recognized that when the high beam headlight is switched off, the decrease in light energy emitted from the low beam headlight is compensated for with infrared rays from the supplemental light which are invisible so that the solenoid relay may maintain the dimmed state of the headlight until the light from the on-coming vehicle has disappeared as the latter passes by without giving rise any glare to the driver of the passing vehicle.

As described above, in the automatic control system of the present invention, the low beam headlight and the supplementary light are on when the high beam headlight is switched off or dimmed. In the embodiment described above, an ordinary incandescent lamp in combination with a filter in the form of a green or blue colored organic film, which will be described in more detail hereinafter, is used as the supplementary light.

Figure 2:
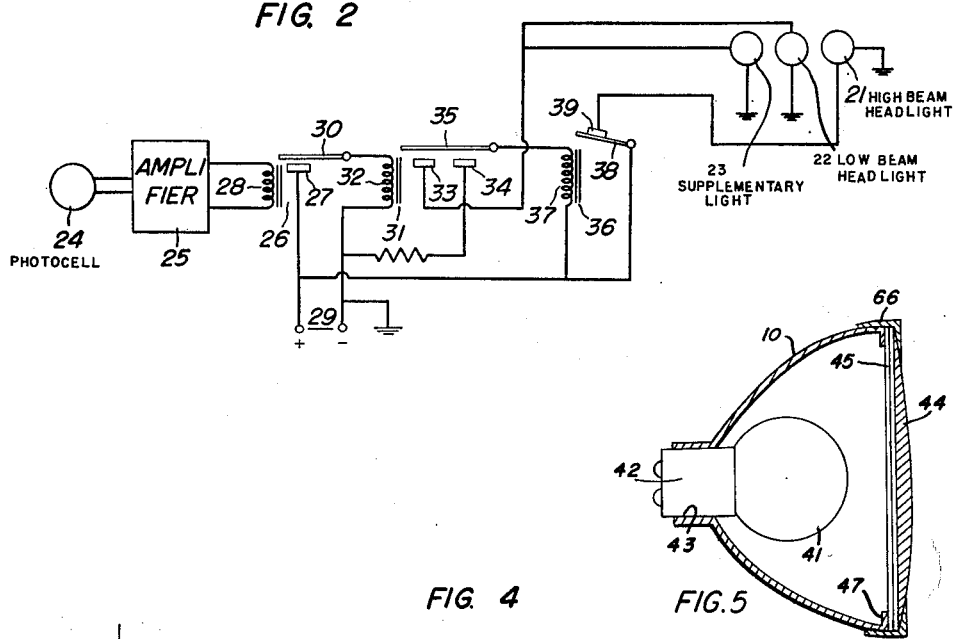

Referring now to FIGURE 2, there is illustrated another embodiment of the present invention in which a high beam headlight is switched off after a supplementary light and a low beam headlight have been switched on. The system illustrated in FIGURE 2 is provided one on each motor vehicle and comprises a high beam headlight 21, a low beam headlight 22, a supplementary light 23 and a photocell 24. The photocell 24 is connected to an amplifier 25 as shown so that the power output of said photocell is amplified by the amplifier 25 to be fed to the solenoid coil 28 of a relay 26.

The relay 26 has a stationary contact 27 connected to one polarity of an electric source 29 and a movable contact 30 connected through a solenoid coil 32 of a second relay 31 to the other polarity of the electric source 29. The second relay 31 comprises two stationary contacts 33 and 34 and a movable contact 35. One of the stationary contacts 34 is connected through a small resistance to the other polarity of said electric source while the movable contact 35 is connected through a solenoid coil 37 of a third relay 36 to said one polarity (+) of the source of electric power 29 as illustrated. A stationary contact 39 of said third relay 36 is normally connected to the high beam headlight 21 so as to hold the headlight on when the vehicle is driven at night. The source of power 29 may take the form of a storage battery as usual.

Connected in parallel to the stationary contact 33 of the second relay 31 are a low beam headlight 22 and a supplementary light 23, as illustrated in FIGURE 2. When the photocell 24 receives light from the high beam headlights of an on-coming vehicle, the output of the photocell is led to the amplifier 25, the output of which in turn is fed to the solenoid coil 28. The solenoid thus energized causes the contacts 27, 30 to be closed so as to energize the solenoid 32 of the second relay 31 thereby causing its movable contact 35 to contact the two stationary contacts 33 and 34 so that the supplementary light 23 is switched on and the coil 37 of the third relay 36 is energized. Thus only after energization of the solenoid coil 37 the high beam headlight is switched off.

In the operation as described above, it is apparent that the high beam headlight is switched off after the supplementary light has been turned off due to the time delay provided by the second and third relays 31 and 36, which are arranged so that the relay 36 for switching the high beam headlight is operated by the second relay arranged to effect switching operation for the supplementary light 23. Thus, undesirable operation is effectively avoided in which any time delay or gap does not exist between the switching-off of the high beam headlight and the switching-on of the supplementary light so that at the same time when the high beam headlight is switched off the energy projected thereby to operate the control system on the on-coming vehicle disappears causing the main headlight on the latter to be again switched on.

The inventor has found it preferable to use as such light source an ordinary incandescent lamp in combination with a blue or green colored filter which has an excellent penetrating power with respect to infrared rays while precluding glare or dazzling effect on the driver of an on-coming vehicle.

A reflector 40 to be mounted on the body portion of a vehicle has a lamp inserted into an opening 43 at the central portion thereof. An incandescent lamp 41 is fixed by means of its base 42 in said opening 43. A lens 44 and a filter 45 are secured to the reflector by a flanged ring 46 at the outer peripheral portion 47. Said filter is a blue or green colored organic film formed of material such as gelatine put between two glass plates adhered to each other. Alternatively, said filter 45 may be formed of solid colored resin by a molding process.

Figure 3:
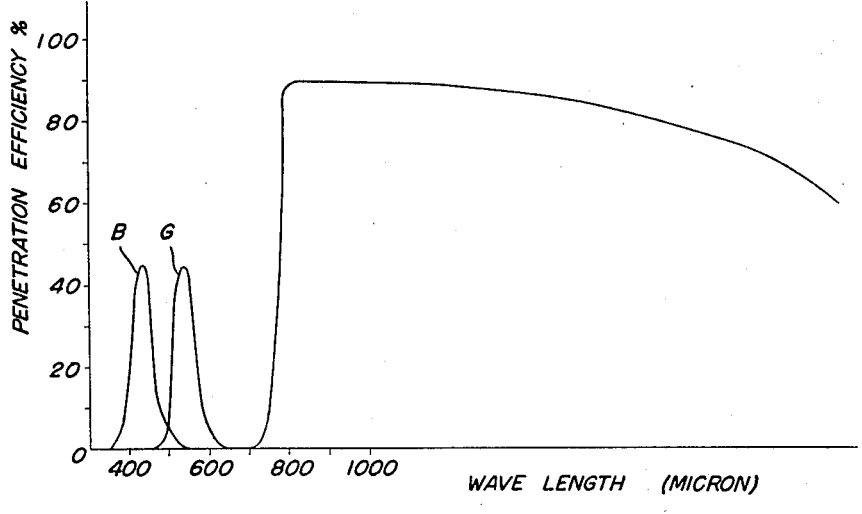
FIGURE 3 is a graphical representation of a characteristic of a filter employed in the invention and comprising a film of organic material, showing penetrating power in percentage plotted against wave lengths.

Such filter suitable for the purpose is commercially available in the form of a blue or green film of organic material. An example of such film of organic material colored blue has a maximum penetration coefficient of approximately 45 percent for the visible range in the vicinity of 4,500 A. as shown by the curve B in FIGURE 3 and an excellent penetration coefficient as high as approximately 90 percent in the infrared region exceeding 7,500 A., as shown. An example of filter made of organic material colored by a green dyestuff also shows a maximum penetration coefficient of approximately 45 percent for the visible range in the vicinity of 5,500 A., as shown by curve G in FIGURE 3, and a penetration coefficient reaching 90 percent in the infrared region over 7,000 A., as with the case of the above described example. These characteristic curves indicate that a filter in the form of a blue or green film of organic material is quite satisfactory as a filter for transmitting infrared rays. Further, the filter is obviously capable of transmitting blue or green light rays enabling a wide variety of photocells to be utilized as a lightsensitive device in the invention.

Figures 4, 5:
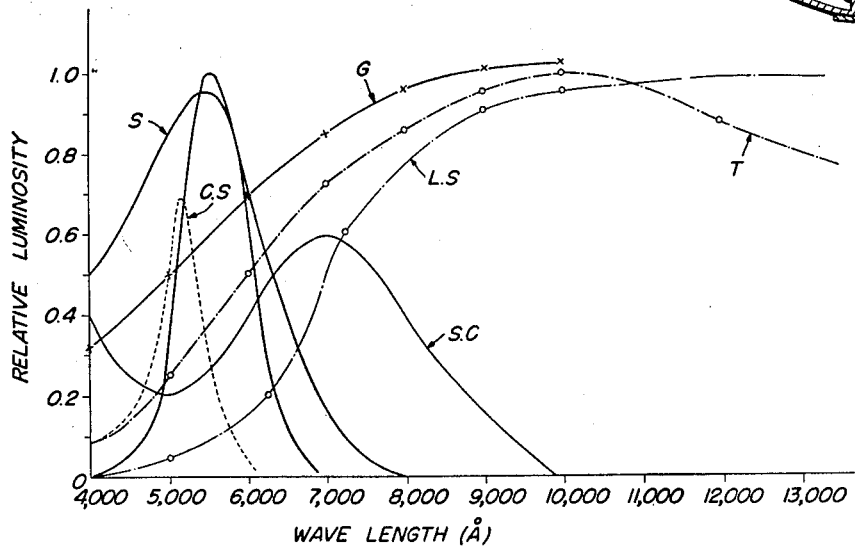
FIGURE 4 is a graphical representation of respective characteristics of a number of photocells utilizable with the filter in accordance with the present invention.
FIGURE 5 is a sectional view of a supplementary lamp device having a filter according to the present invention.

Referring to FIGURE 4, there are shown characteristic curves of a number of photocells which may cooperate with said filter formed of a film of organic material. Curve S shows the characteristic of a selenium cell which has an extremely high sensitivity for light of wave lengths of the order of 5,500 A. and thus satisfactorily operates in response to the light transmitted through a green filter as described above. The curve CS shows the sensitivity characteristic of a cadmium sulfide photocell, which also has an excellent sensitivity in the vicinity of 5,200 A., and thus is also suitable for use as a responding means to cooperate with a green filter of organic material as described above. The curve SC shows the spectral response of a silver cesium photocell with a maximum luminous sensitivity in the vicinity of 7,000 A. Though the curve SC is relatively moderately curved, this type of photocell shows a considerable sensitivity for wave lengths between approximately 4,000 A. and 8,000 A. and hence is suitable for use as a responding means for a blue or green filter as described above. The curve G in FIGURE 4 indicates the sensitivity characteristic of a germanium photocell which shows very excellent sensitivities over a range above approximately 4,000 A. including the infrared region. A lead selenium photocell has also very excellent sensitivities over the range above 7,000 A. as shown by the curve LS in FIGURE 4.

The curve T in FIGURE 4 shows the spectral energy distribution for a tungsten filament of an ordinary incandescent lamp. It will be observed from the curve T that the tungsten filament has a considerable relative luminosity in the infrared region when glowing white so that it is desirable as a light source for the supplementary light to be employed in the control system of the present invention.

As a colored film of organic material a thin colored film formed of colored cellophane or celluloid or other nitrocellulosic material may advantageously be employed. The base for supporting such thin film may be formed either of transparent resinous material or of glass as desired.

Although there have been shown and described herein certain preferred embodiments of the invention, it will be understood that changes and modifications may be made therein without departing from the spirit or scope of the invention claimed. The automatic control system of the invention may for example comprise a single high beam headlight or any desired number thereof, and so with the low beam headlight and the supplementary light of the system.

What is claimed is:
1. In an automatic control system for headlights of motor vehicles having at least one high beam headlight means and a low beam headlight means, at least one supplementary lamp device, a photosensitive device sensitive to visible and infra-red radiations, and switching means connected between said high beam headlight means, low beam headlight means and supplementary lamp device and said photosensitive device and controlled by the output of said photosensitive device for switching off said high beam headlight means while switching on said low beam headlight means and said supplementary lamp device, that improvement in which said supplementary lamp device consists of an incandescent lamp, a reflector in which said lamp is positioned and having an opening through which direct and reflected light from said lamp passes, a filter over said opening through which all of the light from the filament of said lamp is projected, said filter having a colored film formed of an organic material passing only light in the blue-green portion of the visible light spectrum and infra-red light.

2. The improvement as claimed in claim 1 in which said filter comprises a blue-colored film formed of an organic material.

3. The improvement as claimed in claim 1 in which said filter comprises a green-colored film formed of organic material.

4. An automatic control system for headlights of motor vehicles comprising at least one high beam headlight means and a low beam headlight means, at least one supplementary lamp device, a photosensitive device sensitive to visible and infra-red radiations, and switching means having time delay means therein and connected between said high beam headlight means, low beam headlight means and said supplementary lamp device and said photosensitive device for switching off said high beam headlight means while switching on said low beam headlight means and said supplementary lamp device, said supplementary lamp device consisting of an incandescent lamp, a reflector in which said lamp is positioned and having an opening through which direct and reflected light from said lamp passes, a filter over said opening through which all of the light from the incandescent lamp is projected, said filter having a color film formed of an organic material passing only light in the blue-green portion of the visible light spectrum and infra-red light.

References Cited by the Examiner
UNITED STATES PATENTS

| 1,500,912 | 7/24 | Williams | 313—112 X |
| 1,547,026 | 7/25 | Canney | 88—106 X |
| 1,924,714 | 8/33 | Falge | 313—112 X |
| 1,942,289 | 1/34 | Hipp | 315—83.1 |
| 2,423,278 | 7/47 | Willis | 315—83.1 |

FOREIGN PATENTS

| 759,160 | 11/33 | France. |
| 937,274 | 12/55 | Germany. |

GEORGE N. WESTBY, *Primary Examiner.*

ARTHUR GAUSS. RALPH G. NILSEN *Examiners.*